(12) United States Patent
Jeong

(10) Patent No.: US 6,340,854 B1
(45) Date of Patent: Jan. 22, 2002

(54) SCANNER MOTOR

(75) Inventor: Dae Hyun Jeong, Suwon-Shi (KR)

(73) Assignee: Samsung-Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/594,359

(22) Filed: Jun. 15, 2000

(30) Foreign Application Priority Data

Mar. 27, 2000 (KR) .............................................. 00-15501

(51) Int. Cl.[7] .............................................. H02K 7/08
(52) U.S. Cl. ...................... 310/90; 310/90.5; 310/67 R; 384/107
(58) Field of Search ...................... 310/90, 90.5, 67 R; 360/99.08; 384/100, 105, 107, 111, 112, 113, 114, 115

(56) References Cited

U.S. PATENT DOCUMENTS

| | | | | |
|---|---|---|---|---|
| 4,717,223 A | * | 1/1988 | Ishida et al. .................. 350/6.8 |
| 5,280,208 A | * | 1/1994 | Komura et al. ................ 310/90 |
| 5,357,162 A | | 10/1994 | Aiyoshizawa et al. ........ 310/90 |
| 5,358,339 A | | 10/1994 | Konno et al. ................ 384/107 |
| 5,675,201 A | * | 10/1997 | Komura et al. ............. 310/90.5 |
| 5,731,831 A | * | 3/1998 | Murabe et al. ............. 347/259 |
| 6,175,174 B1 | * | 1/2001 | Takahashi .................. 310/90.5 |

* cited by examiner

Primary Examiner—Karl Tamai
Assistant Examiner—Thanh Lam
(74) Attorney, Agent, or Firm—Darby & Darby

(57) ABSTRACT

A scanner motor of a laser beam printer capable of removing a bearing friction during a high-speed rotation thereof, thereby minimizing generation of noise and vibrations, while achieving an enhancement in durability and keeping a stable drivability of a mirror. The scanner motor includes a cylindrical sleeve attached, at a lower end thereof, with a cap, a stator assembly fitted around the sleeve, a sintered bearing tightly fitted in the sleeve, the sintered bearing having upper and lower dynamic pressure generating grooves at the inner peripheral surface thereof, an annular fixed magnet fitted in an upper end of the sleeve, the fixed magnet having opposite poles vertically arranged, a shaft vertically inserted in the sintered bearing, the shaft being spaced, at a lower end thereof, apart from the cap by a desired height, an annular rotating magnet fitted around the shaft while having opposite poles vertically arranged, the rotating magnet facing the fixed magnet in a horizontal direction in such a fashion that the horizontally facing poles thereof have opposite polarities attracting each other, respectively, and a rotor case coupled at an upper end thereof to an upper end of the shaft and attached with an annular driving magnet at an inner peripheral surface thereof in such a fashion that a yoke is interposed between the driving magnet and the rotor case.

4 Claims, 3 Drawing Sheets

SCANNER MOTOR

BACKGROUND OF THE INVENTION

1. Field of the Invention

The present invention relates to a scanner motor of a laser beam printer, and more particularly to such a scanner motor which is capable of completely removing a bearing friction during a high-speed rotation thereof, thereby minimizing generation of noise and vibrations, while achieving an enhancement in durability and keeping a stable drivability of a mirror included in a laser beam printer to which the scanner motor is applied.

2. Description of the Prior Art

In an optical scanning device applied to laser beam printers, the most essential part thereof is typically a scanner is motor adapted to rotate, at a high speed, a polygon mirror provided to fully reflect a laser beam toward a photosensitive drum.

Referring to FIG. 1, a conventional scanner motor is illustrated. The scanner motor has a configuration substantially similar to that of a compact spindle motor applied to compact precise appliances.

As shown in FIG. 1, the scanner motor includes a wide circuit board 1, and a cylindrical sleeve 2 coupled at a lower end thereof to the circuit board 1. A stator assembly 3, which includes a core wound with coils, is fitted around an upper portion of the sleeve 2.

A shaft 4, which has upper and lower dynamic pressure generating grooves 4a at the peripheral surface thereof, is fitted in the sleeve 2 in such a fashion that the dynamic pressure generating grooves 4a are surrounded by the sleeve 2.

A holder 5 is fitted around the upper end of the shaft 4 protruded from the upper end of the sleeve 2. A polygon mirror 6 is firmly seated on the holder 5.

A rotor case 7 is mounted to the lower end of the holder 5 in such a fashion that it extends downwardly. The rotor case 7 has a cylindrical skirt. A magnet 7a is attached to the inner peripheral surface of the rotor case 7 in such a fashion that it faces the stator assembly 3 while being spaced apart from the stator assembly 3 by a desired distance.

In the scanner motor having the above mentioned configuration, the rotor case 7, the magnet 7a attached to the rotor case 7, the holder 5 coupled with the rotor case 7, and the polygon mirror 6 coupled to the holder 5 are simultaneously rotated about the shaft 4 in accordance with a rotating electromagnetic force generated between the stator assembly 3, that is, its core and coil, and the magnet 7a of the rotor case 7. The rotating polygon mirror 6 reflects a laser beam projected thereon.

The shaft 4 is pivotally supported by a washer 8 mounted at the lower end thereof while supporting its radial weight by the dynamic pressure generating grooves 4a.

That is, oil is concentrated at the upper and lower dynamic pressure generating grooves 4a formed on the peripheral surface of the shaft 4a during a rotation of the shaft 4, so that the shaft 4 can rotate smoothly under the condition in which it does not come into contact with the sleeve by virtue of the oil pressure.

Meanwhile, the important factor to be taken into consideration in such a scanner motor is to allow the polygon mirror 6 coupled to the holder 5 to be stably driven during the rotation of the shaft 4.

When the polygon mirror 6 moves radially or axially even in a small amount, the reflection angle of the laser beam may vary, thereby degrading printing characteristics.

To this end, the above mentioned conventional scanner motor is configured to support the radial weight by the dynamic pressure generating grooves 4a formed at the shaft 4. However, the dynamic pressure generating grooves 4a of the shaft 4, which is a rotating element, promotes an abrasion of the shaft 4 because it comes into severe frictional contact with oil. Also, the dynamic pressure generating grooves 4a serve as a rotating load, thereby resulting in a reduction in drive force.

Furthermore, the above mentioned conventional scanner motor cannot appropriately cope with a substantially axial weight because it simply uses the configuration in which the lower end of the shaft is pivotally supported by the washer 8. In particular, the holder 5 mounted with the polygon mirror 6 is made of an aluminum material allowing a highly precise machining in order to obtain a stable mounting of the polygon mirror 6. On the other hand, the rotor case 7 coupled to the holder 5 is made of a general metal, and the coupling of the rotor case 7 to the holder is made in a cocking fashion. For this reason, the coupling state between the holder 5 and rotor case 7 having different thermal expansion coefficients may be rendered to be instable when heat of a high temperature is generated during a high-speed rotation of the motor. As a result, the driving of the polygon mirror 6 may be instable, thereby degrading printing characteristics.

SUMMARY OF THE INVENTION

Therefore, the present invention has been made in view of the above mentioned problems, and an object of the invention is to provide a scanner motor of a laser beam printer which is capable of greatly reducing generation of vibrations during a rotation of a polygon mirror included in the laser beam printer, thereby achieving an improvement in reliability in terms of performance.

Another object of the invention is to provide a scanner motor of a laser beam printer which has a configuration in which its shaft is driven in a non-contact state with respect to its sleeve, thereby avoiding occurrence of a contact abrasion to achieve an improvement in durability.

Another object of the invention is to provide a scanner motor of a laser beam printer which has a configuration in which its holder for seating a polygon mirror and its rotor case are integral with each other, thereby achieving a reduction in the number of fabrication processes used while obtaining a stable drivability.

In accordance with the present invention, these objects are accomplished by providing scanner motor comprising: a circuit board; a cylindrical sleeve coupled to the circuit board at a lower end thereof, the cylindrical sleeve being attached, at the lower end thereof, with a cap adapted to cover the lower end thereof; a stator assembly fitted around the sleeve in a vertical direction, the stator assembly including a core wound with coils; a sintered bearing tightly fitted in the sleeve in a vertical direction, the sintered bearing having upper and lower dynamic pressure generating grooves formed at upper and lower portions of an inner peripheral surface thereof, respectively; an annular fixed magnet fitted in an upper end of the sleeve, the fixed magnet having opposite poles vertically arranged; a shaft vertically inserted in the sintered bearing, the shaft being spaced, at a lower end thereof, apart from the cap by a desired height; an annular rotating magnet fitted around the shaft while having opposite poles vertically arranged, the rotating magnet facing the fixed magnet in a horizontal direction in such a fashion that the horizontally facing poles thereof have opposite polarities attracting each other, respectively; and a rotor case coupled at an upper end thereof to an upper end of the shaft above the rotating magnet, the rotor case having a cylindrical skirt extending downwardly from the upper end thereof, the rotor case being attached with a polygon mirror at a top surface thereof and with an annular driving magnet at an inner peripheral surface of the skirt in such a fashion that a yoke is interposed between the driving magnet and the skirt.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
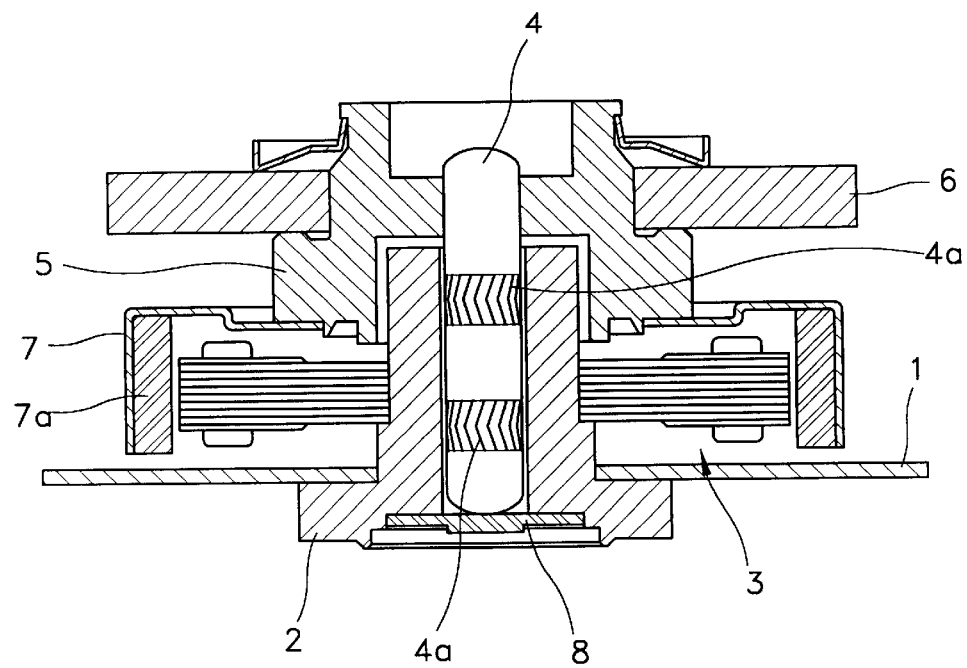
FIG. 1 is a cross-sectional view illustrating a conventional scanner motor.
Figure 2:
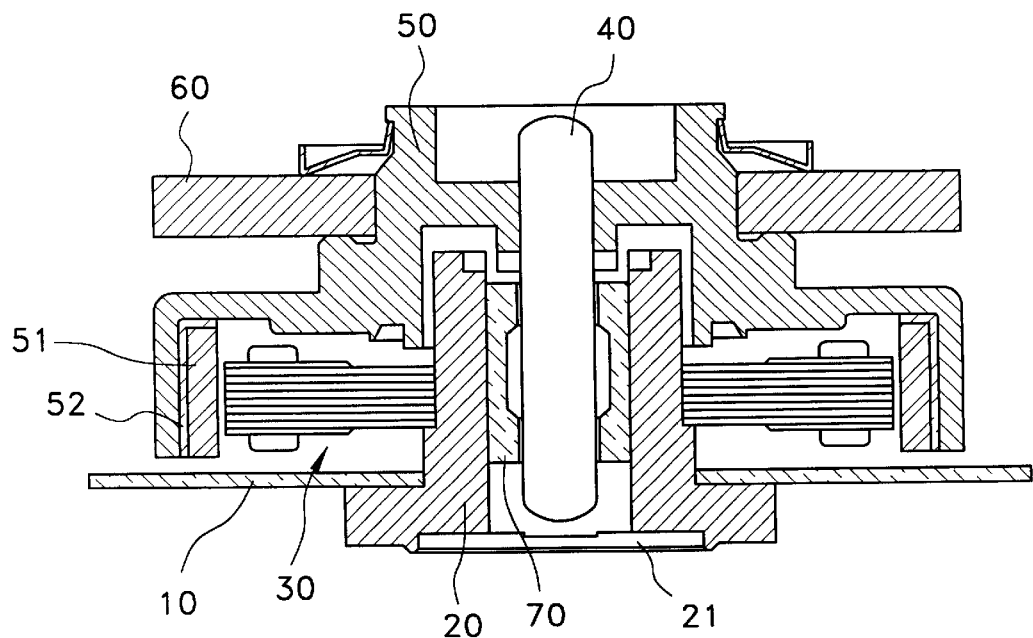
FIG. 2 is a cross-sectional view illustrating a scanner motor according to the present invention.

FIG. 2 is a cross-sectional view illustrating a scanner motor according to the present invention. As shown in FIG. 2, the scanner motor includes a circuit board 10, and a cylindrical sleeve 20 coupled to the circuit board 10. A stator assembly 30, which includes a core wound with coils, is fitted around the sleeve 20. A shaft 40 is fitted in the sleeve 20 in such a fashion that it rotates with respect to the sleeve 20. A rotor case 50 is operatively connected to the shaft 40 and provided with a downwardly-extending cylindrical skirt.

The above mentioned configuration of the scanner motor is similar to that of the conventional scanner motor. In accordance with the present invention, however, a separate sintered bearing 70 is provided as a means for directly supporting the shaft 40.

The sintered bearing 70 is a cylindrical bearing member interposed between the sleeve 20 and the shaft 40 while having a length less than that of the sleeve 20. The sintered bearing 70 is provided with upper and lower dynamic pressure generating grooves 71 at its inner peripheral surface being in contact with the peripheral surface of the shaft 40. The sintered bearing 70 is also provided with an annular recess at its inner peripheral surface between the upper and lower dynamic pressure generating grooves 71 in order to keep a certain amount of oil in the recess.

The sintered bearing 70 is made by compacting metal powder, sintering the compact, and impregnating oil in the sintered compact. Accordingly, the sintered bearing 70 is always impregnated with a large amount of oil. In particular, the sintered bearing 70 has a porous structure at its inner peripheral surface within the annular recess formed between the upper and lower dynamic pressure generating grooves 71. Accordingly, it is possible to achieve a stable supply of oil from the annular recess to the upper and lower dynamic pressure generating grooves 71 while keeping a desired amount of oil in the annular recess.

Figure 3:
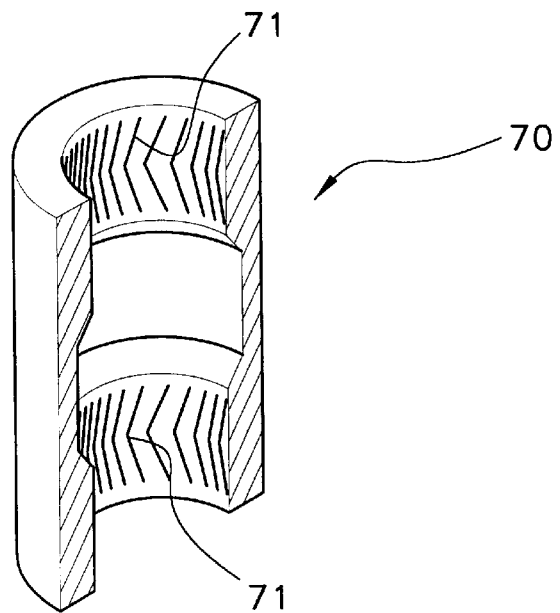
FIG. 3 is a partially-broken perspective view illustrating a sintered bearing formed with dynamic pressure generating grooves having a herringbone shape in accordance with the present invention.
Figure 4:
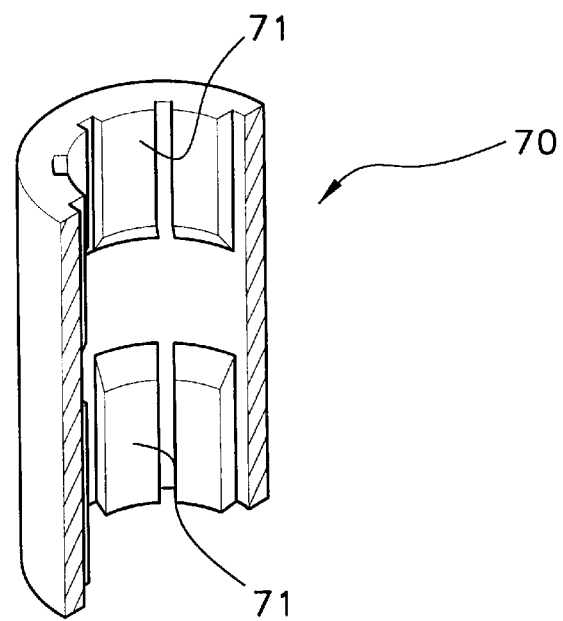
FIG. 4 is a partially-broken perspective view illustrating a sintered bearing formed with dynamic pressure generating grooves having an axial shape in accordance with the present invention.
Figure 5:
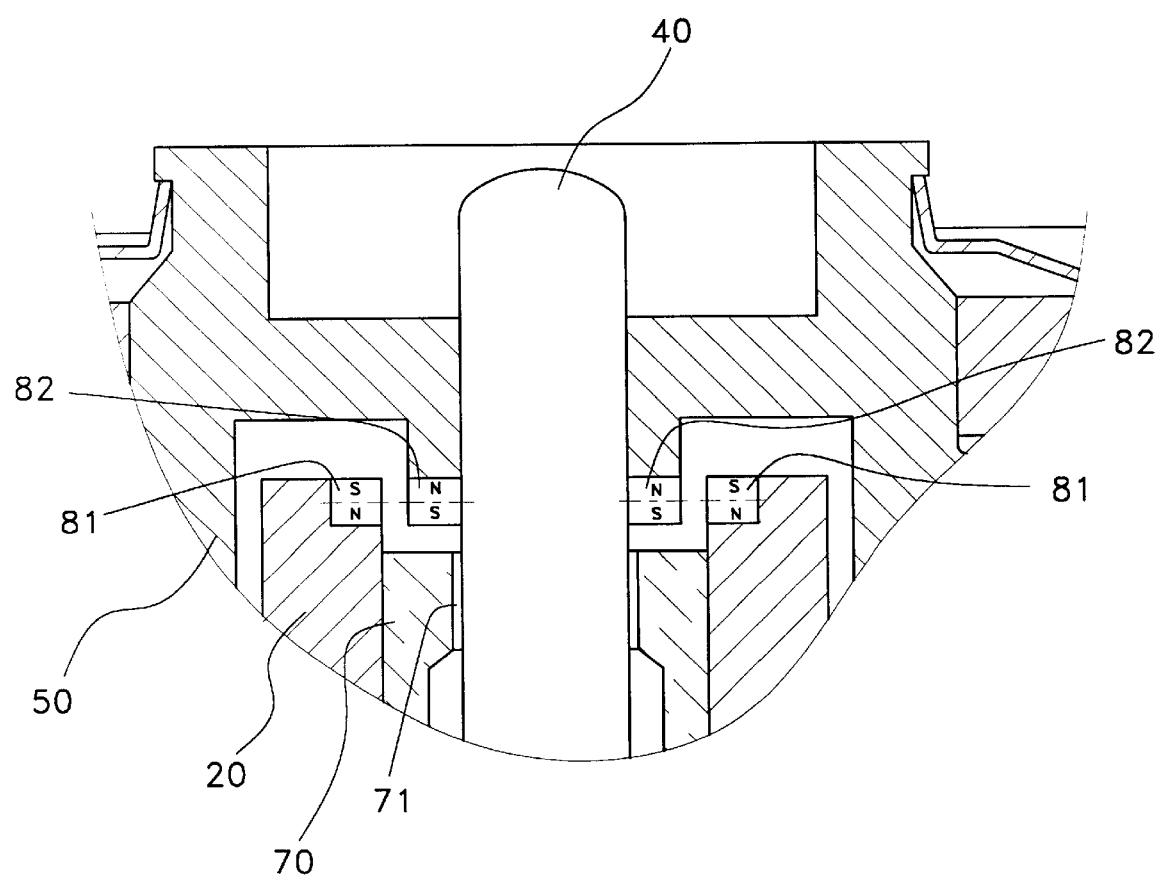
FIG. 5 is an enlarged view of a part of the scanner motor, illustrating a structure supporting the axial weight of a shaft included in the scanner motor in accordance with the present invention.

The dynamic pressure generating grooves 71 arranged at the upper or lower end of the sintered bearing 70 may have a herringbone shape, as shown in FIG. 3. Alternatively, the dynamic pressure generating grooves 71 may have an axial groove shape in such a fashion that they extend axially while being uniformly spaced from one another in a circumferential direction, as shown in FIG. 4.

The shaft 40 is fitted in the sintered bearing 70 in such a fashion that it does not come into contact with the sintered bearing 70 at the entire portion thereof, as different from that of the conventional configuration in which the shaft is pivotally supported.

The vertically extending hollow portion of the sleeve 20 is covered by a typical cap 21 at its lower end in order to prevent oil filled in the sleeve 20 from being discharged from the sleeve 20. In the conventional scanner motor, a washer is seated on the cap, such as the cap 21, to support the shaft. In accordance with the present invention, however, such a washer is dispensed with. In accordance with the present invention, the shaft 40 is maintained in such a fashion that its lower end is suspended at a certain level over the cap 21.

An annular fixed magnet 81 and an annular rotating magnet 82, each of which have opposite poles vertically arranged, are mounted at the upper end of the sleeve 20 and a corresponding portion of the peripheral surface in the shaft 40, respectively. The fixed magnet 81 and rotating magnet 82 face each other in a horizontal direction in such a fashion that the horizontally facing poles thereof have opposite polarities, so that they attract each other at their facing surfaces.

Also, a holder, which is adapted to seat a polygon mirror on the rotor case 50, is integrally formed at the rotor case 50, as different from that of the convention configuration. Preferably, the rotor case 50 is made of the same material as that of the holder, that is, aluminum used in the conventional case. The polygon mirror, which is denoted by the reference numeral 60, is directly seated on the rotor case 50.

A driving magnet 51 is attached to the inner peripheral surface of the rotor case 50 in such a fashion that it faces the stator assembly 30 while being spaced apart from the stator assembly 30 by a desired distance. Since the rotor case 50 is made of an aluminum material, it has non-conductive characteristics. To this end, a yoke 52 is preferably interposed between the rotor case 50 and driving magnet 51 in order to allow magnetic flux to be generated.

In the scanner motor having the above mentioned configuration according to the present invention, a uniform oil film is formed and kept between the shaft 40 and the sintered bearing 70 because oil is always impregnated in the sintered bearing 70. In particular, the radial weight of the shaft 40 is stably supported by virtue of a dynamic pressure effect generated at the dynamic pressure generating grooves 71 in the sintered bearing 70.

Oil flowing during a high-speed rotation of the shaft 40 comes into contact with the sintered bearing 70, thereby generating a frictional force. Since the sintered bearing 70 is in a fixed state, however, this frictional force is greatly reduced, as compared to the conventional case in which the dynamic pressure generating grooves are provided at the rotating shaft. Accordingly, it is possible to minimize an abrasion caused by a drive friction of oil. In particular, such a reduction in friction results in a great reduction in generation of drive noise and vibrations at the shaft 40.

Meanwhile, the fixed magnet 81 and rotating magnet 82, which are interposed between the upper end of the sleeve 20 and the peripheral surface of the shaft 40, serve to prevent the shaft 40 from moving vertically in accordance with their attraction effecting therebetween.

Thus, during the rotation of the shaft 40, the radial weight of the shaft 40 is uniformly supported by dynamic pressure generated at the dynamic pressure generating grooves 71 of the sintered bearing 70 whereas the axial weight of the shaft 40 is supported by the attraction effecting between the fixed magnet 81 and rotating magnet 82.

Accordingly, it is possible to accurately keep the concentricity of the shaft 40. In the hydraulic dynamic pressure bearing field, it is difficult to accurately keep such a concentricity. As a result, there are no or little radial and vertical movements of the rotor case 50 during a rotation thereof.

In particular, the present invention has another structural feature in that the rotor case 50 is made of an aluminum material while having a holder function for seating the polygon mirror thereon.

Where a separate holder is coupled to the rotor case in a cocking fashion, a degradation in coupling force and an instable drivability at the coupling area may occur due to a thermal expansion difference between the rotor case and holder generated due to heat of a high temperature generated during a high-speed rotation of the motor. In accordance with the present invention, such a problem is completely solved by eliminating the above mentioned material difference.

Thus, the present invention is capable of radially and axially supporting the shaft 40 in a non-contact fashion, thereby obtaining an enhanced high-speed drivability, while achieving an improved concentricity of the shaft 40 and a more stable drivability of the polygon mirror 60 coupled to the rotor case 50 by virtue of the holder-integrated structure of the rotor case 50.

As apparent from the above description, the present invention provides an accurate and stable concentricity and a stable drivability of the polygon mirror 60 by virtue of the provision of the sintered bearing 70, fixed magnet 81, and rotating magnet 82, and an improvement in the structure of the rotor case 50 on which the polygon mirror 60 is seated. Accordingly, the present invention provides very useful effects capable of improving the drive characteristics of the motor, that is, achieving a reduction in the start-up time, a reduced consumption of electric power, an avoidance of noise and vibrations, an improvement in durability, and an improvement in the printing performance of the polygon mirror 60.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A scanner motor comprising:

a circuit board;

a cylindrical sleeve coupled to the circuit board at a lower end thereof, the cylindrical sleeve being attached, at the lower end thereof, with a cap adapted to cover the lower end thereof;

a stator assembly fitted around the sleeve in a vertical direction, the stator assembly including a core wound with coils;

a sintered bearing tightly fitted in the sleeve in a vertical direction, the sintered bearing having upper and lower dynamic pressure generating grooves formed at upper and lower portions of an inner peripheral surface thereof, respectively;

an annular fixed magnet fitted in an upper end of the sleeve, the fixed magnet having opposite poles vertically arranged;

a shaft vertically inserted in the sintered bearing, the shaft being spaced, at a lower end thereof, apart from the cap by a desired height;

an annular rotating magnet fitted around the shaft while having opposite poles vertically arranged, the rotating magnet facing the fixed magnet in a horizontal direction in such a fashion that the horizontally facing poles thereof have opposite polarities attracting each other, respectively; and a rotor case coupled at an upper end thereof to an upper end of the shaft above the rotating magnet, the rotor case having a cylindrical skirt extending downwardly from the upper end thereof, the rotor case being attached with a polygon mirror at a top surface thereof and with an annular driving magnet at an inner peripheral surface of the skirt in such a fashion that a yoke is interposed between the driving magnet and the skirt.

2. The scanner motor according to claim 1, wherein the dynamic pressure generating grooves of the sintered bearing have a herringbone shape.

3. The scanner motor according to claim 1, wherein the dynamic pressure generating grooves of the sintered bearing have an axial shape.

4. The scanner motor according to claim 1, wherein the rotor case has a holder integrally formed at the rotor case and adapted to seat a polygon mirror on the rotor case, both the rotor case and the holder being made of an aluminum material.

* * * * *

UNITED STATES PATENT AND TRADEMARK OFFICE
CERTIFICATE OF CORRECTION

PATENT NO. : 6,340,854 B1 Page 1 of 1
DATED : January 22, 2002
INVENTOR(S) : Jeong et al.

It is certified that error appears in the above-identified patent and that said Letters Patent is hereby corrected as shown below:

<u>Title page,</u>
Item [*] Notice, delete the phrase "by 0 days" and insert -- by 40 days --

Signed and Sealed this

Thirtieth Day of March, 2004

JON W. DUDAS
*Acting Director of the United States Patent and Trademark Office*